(12) United States Patent
Dominique et al.

(10) Patent No.: US 8,160,029 B2
(45) Date of Patent: Apr. 17, 2012

(54) METHODS FOR POWER REDUCTION DETECTION FOR ENHANCED DEDICATED CHANNEL

(75) Inventors: Francis Dominique, Rockaway, NJ (US); Hongwei Kong, Denville, NJ (US); Walid Elias Nabhane, Bedminster, NJ (US)

(73) Assignee: Alcatel Lucent, Paris (FR)

( * ) Notice: Subject to any disclaimer, the term of this patent is extended or adjusted under 35 U.S.C. 154(b) by 1464 days.

(21) Appl. No.: 11/640,972

(22) Filed: Dec. 19, 2006

(65) Prior Publication Data

US 2008/0144741 A1 Jun. 19, 2008

(51) Int. Cl.
*H04B 7/216* (2006.01)

(52) U.S. Cl. ........ 370/335; 370/352; 370/254; 370/229; 370/338; 370/401; 370/342; 455/450; 455/442; 455/436; 455/562; 455/566

(58) Field of Classification Search .................. 370/352, 370/254, 229, 338, 225, 401, 335, 342, 329, 370/479, 328; 455/436, 442, 562.1, 414.1, 455/566, 13.4, 69, 561, 426.1, 450
See application file for complete search history.

(56) References Cited

U.S. PATENT DOCUMENTS

| | | | | |
|---|---|---|---|---|
| 6,810,074 B1 * | 10/2004 | Kim et al. | .......... | 375/147 |
| 2002/0119796 A1 * | 8/2002 | Vanghi | .......... | 455/522 |
| 2003/0003898 A1 * | 1/2003 | Banerjee et al. | .......... | 455/414 |
| 2003/0100300 A1 * | 5/2003 | Yang et al. | .......... | 455/426 |
| 2004/0072565 A1 * | 4/2004 | Nobukiyo et al. | .......... | 455/436 |
| 2004/0109461 A1 * | 6/2004 | Suzuki et al. | .......... | 370/401 |
| 2004/0142692 A1 * | 7/2004 | Schwarz et al. | .......... | 455/442 |
| 2004/0204108 A1 * | 10/2004 | Etkin et al. | .......... | 455/562.1 |
| 2005/0141688 A1 * | 6/2005 | Wengrovitz | .......... | 379/207.02 |
| 2005/0190747 A1 * | 9/2005 | Sindhwani et al. | .......... | 370/352 |
| 2006/0007914 A1 * | 1/2006 | Chandra et al. | .......... | 370/352 |
| 2007/0281708 A1 * | 12/2007 | Bakhuizen et al. | .......... | 455/450 |
| 2007/0297360 A1 * | 12/2007 | Joachim et al. | .......... | 370/329 |
| 2008/0214197 A1 * | 9/2008 | Englund et al. | .......... | 455/450 |
| 2008/0287132 A1 * | 11/2008 | Torsner et al. | .......... | 455/442 |
| 2009/0034487 A1 * | 2/2009 | Lohr et al. | .......... | 370/335 |

* cited by examiner

*Primary Examiner* — Rafael Pérez-Gutiérrez
*Assistant Examiner* — Joseph Arévalo
(74) *Attorney, Agent, or Firm* — Harness, Dickey & Pierce, P.L.C.

(57) ABSTRACT

A method for detecting transmission power reduction in a physical channel including at least a non-enhanced data channel portion, a non-enhanced control channel portion, an enhanced control channel portion and an enhanced data channel portion is provided. The method includes estimating a ratio of a transmission power associated with the enhanced data channel to transmission power associated with the non-enhanced control channel portion, comparing the estimated ratio with a threshold, the threshold being determined based on a format indicator associated with the enhanced data channel portion, and detecting a transmission power reduction in the enhanced data channel portion based on the comparing step.

19 Claims, 9 Drawing Sheets

METHODS FOR POWER REDUCTION DETECTION FOR ENHANCED DEDICATED CHANNEL

BACKGROUND OF THE INVENTION

A cellular communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and a Universal Mobile Telecommunications System (UMTS).

Third generation wireless communication protocol standards (e.g., 3GPP-UMTS, 3GPP2-CDMA2000, etc.) may employ a dedicated traffic channel in the uplink (e.g., a communication flow between a mobile station (MS) or User Equipment (UE), hereinafter referred to as a user, and a base station (BS) or Node B. The dedicated physical channel may include a data part (e.g., a dedicated physical data channel (DPDCH) in accordance with UMTS Release 4/5 protocols, a fundamental channel or supplemental channel in accordance with CDMA2000 protocols, etc.) and a control part (e.g., a dedicated physical control channel (DPCCH) in accordance with UMTS Release 4/5 protocols, a pilot/power control subchannel in accordance with CDMA2000 protocols, etc.).

Newer versions of these standards, for example, Release 6 of UMTS provide for high data rate uplink channels referred to as enhanced dedicated physical channels. These enhanced dedicated physical channels (E-DCHs) may include an enhanced data part (e.g., an enhanced dedicated physical data channel (E-DPDCH) in accordance with UMTS protocols) and an enhanced control part (e.g., an enhanced dedicated physical control channel (E-DPCCH)) in accordance with UMTS protocols.

FIG. 1 illustrates a conventional wireless communication system 100 operating in accordance with UMTS protocols. Referring to FIG. 1, the wireless communication system 100 may include a number of Node Bs such as Node Bs 120, 122 and 124, each serving the communication needs of a first type of user 110 and a second type of user 105 in their respective coverage area. The first type of user 110 may be a higher data rate user such as a UMTS Release 6 user, referred to hereinafter as an enhanced user. The second type of user may be a lower data rate user such as a UMTS Release 4/5 user, referred to hereinafter as a legacy user. The Node Bs are connected to an RNC such as RNCs 130 and 132, and the RNCs are connected to a MSC/SGSN 140. The RNC handles certain call and data handling functions, such as, autonomously managing handovers without involving MSCs and SGSNS. The MSC/SGSN 140 handles routing calls and/or data to other elements (e.g., RNCs 130/132 and Node Bs 120/122/124) in the network or to an external network. Further illustrated in FIG. 1 are interfaces Uu, Iub, Iur and Iub between these elements.

FIG. 2A illustrates an example frame structure for the UMTS uplink dedicated physical channels (DCHs). As shown, each frame 200 may have a length of, for example, 10 milliseconds (ms) and may be partitioned into 15 slots 205. Each slot 205 may have a length of, for example, 2560 chips, which corresponds to one power-control period, and may have a duration of, for example, ⅔ ms.

The uplink dedicated physical channels include a DPDCH 240 and a DPCCH 220, and each of the DPCCH 220 and the DPDCH 240 may be code multiplexed. The DPDCH 240 may include information transmitted from the legacy user 105. The DPCCH 220 may include control information, for example, a pilot signal 221, transmit power control information (e.g., transmit power control (TPC) bits) 222, a transport format combination indicator (TFCI) value 223 and feedback information (FBI) 224 (which may be used or unused).

The TFCI 223 may inform the Node B 120/122/124 of the transport format information (e.g., voice and/or data packets sizes, coding types, etc.) transmitted from the legacy user 105. The legacy user 105 and the Node Bs 120/122/124 may generate transmit power control (TPC) commands 222 to control each others transmit power. When user 105 communicates with, for example, a single Node B 120/122/124, a single transmit power control command may be received in the TPC information 222 of each timeslot.

While FIG. 2A illustrates a 3GPP-UMTS uplink frame structure, a 3GPP2-CDMA2000 uplink frame structure may be similar. However, a typical 3GPP2-CDMA2000 uplink frame structure does not include the above-described TFCI 223 and FBI 224.

FIG. 2B illustrates an example frame structure for the enhanced dedicated channels (e.g., E-DPCCH and E-DPDCH) in the uplink direction. As shown, each frame 200a may have a length of, for example, 10 milliseconds (ms) and may be partitioned into 5 sub-frames each including 3 slots. Each slot 205a may have a length of, for example, 2560 chips, and may have a duration of, for example, ⅔ ms. Consequently, each sub-frame may have a duration of 2 ms.

As discussed above, an E-DCH includes an E-DPDCH 240a and an E-DPCCH 220a, and each of the E-DPCCH 220a and the E-DPDCH 240a may be code multiplexed. The E-DPCCH 220a carries control information for an associated E-DPDCH 240a. This control information includes three components: a re-transmission sequence number (RSN), a transport format indicator (TFI) and a happy bit. The RSN indicates the transmission index of an associated packet transmitted on the E-DPDCH, has a maximum value of 3 and is represented by two bits. The TFI indicates the data format for the transport channel carried by the associated E-DPDCH (e.g., transport block size, transmission time interval (TTI), etc.) and is represented by 7 bits. The happy bit is a binary indicator, which may be used by a UE to inform one or more NodeBs whether the UE is satisfied with the current setup of the E-DCH channels and is represented by a single bit. For example, UE 110 of FIG. 1 may use this indicator to inform one of the NodeBs 120/122/124 that the UE 110 may handle greater data capacity. In other words, the happy bit is a rate increase request bit.

E-DCHs are often used together with the high speed downlink packet access (HSDPA). As a result, the UE may also transmit the uplink HS-DPCCH, which carries the acknowledgment and channel quality indicator (CQI) for the downlink.

FIG. 2C illustrates a frame structure of an uplink HS-DPCCH. As shown, HS-DPCCH frames are transmitted in subframes, each of which spans three timeslots $T_s$. Each timeslot $T_s$ may be 2560 chips in length. The first timeslot HARQ-ACK carries the acknowledge bit (ACK-NACK) and the final two timeslots CQI carry the CQI information. HS-DPCCH is code and I/Q multiplexed with the DPCCH and the DPDCH and transmitted to the Node B. When transmitted, the HS-DPCCH subframe is offset from the DPCCH frame in a unit of 256 chip symbols depending on the time relationship between the downlink DPCH and the HS-DSCH of the serving sector FIG. 3 illustrates a conventional UMTS uplink transmitter 300 located at the enhanced UE 110 of FIG. 1 and a receiver 350 located at one of the NodeBs 120/122/124. The conventional transmitter 300 and receiver 350 of FIG. 3 may transmit and receive E-DCHs, DPCCHs and/or HS-DCHs.

Referring to FIG. 3, data associated with an upper layer enhanced dedicated transport channel (E-DCH) may be processed into E-DPDCH frames at the transmission channel processing block 302. The frames may be binary phase shift keying (BPSK) modulated and orthogonally spread at the modulation and orthogonal spreading unit 304. The spread modulated frames are received by the gain unit 306 where an amplitude of the spread, modulated frames may be adjusted. A combiner 333 receives the output of the gain unit 306.

Still referring to FIG. 3, the 2 RSN bits, the 7 TFI bits and the 1 happy bit are mapped into a 10-bit E-DPCCH word, which may be control information for an associated E-DPDCH frame having a transmission time interval (TFI) of, for example, 2 ms or 10 ms. The 10-bit E-DPCCH word may then be coded into a 30-bit coded sequence at an FEC unit 308. The 30-bit coded sequence is modulated at a BPSK Modulator 310 and orthogonally spread at an orthogonal spreading unit 312. The output from the orthogonal spreading unit 312 is gain adjusted at a gain unit 331 and output to the combiner 333.

Similar to the above E-DPCCH, well-known DPCCH frames used in determining channel estimates are modulated at a BPSK Modulator 314, and the modulated frames are orthogonally spread at an orthogonal spreading unit 316. The output from the orthogonal spreading unit 316 is gain adjusted at a gain unit 318 and output to the combiner 335.

Referring still to FIG. 3, data associated with an upper layer dedicated transport channel (DCH) may be processed into DPDCH frames at the transmission channel processing block 320. The frames may be binary phase shift keying (BPSK) modulated and orthogonally spread at the modulation and orthogonal spreading unit 322. The spread modulated frames are received by the gain unit 324 where an amplitude of the spread modulated frames may be adjusted. A combiner 337 receives the output of the gain unit 324.

Similar to the above E-DPCCH and DPCCH, well-known HS-DPCCH frames are modulated at a BPSK Modulator 326, and the modulated frames are orthogonally spread at an orthogonal spreading unit 328. The output from the orthogonal spreading unit 328 is gain adjusted at a gain unit 330 and output to the combiner 337.

The outputs of each of the gain units 324 and 330 are combined at combiner 337, and the resultant combined signal is output to combiner 335. The combiner 335 combines the output of the gain unit 318 with the output from the combiner 337, and outputs the resultant to the combiner 333. The outputs from gain units 306, 331 and the combiner 335 (e.g., code-division multiplexed) are combined into a combined signal by combiner unit 333. The combined signal is scrambled and filtered by a shaping filter 332, and the output of the shaping filter 332 is sent to the receiver 350 via a propagation channel 334 (e.g., over the air).

At the receiver 350, the transmitted signal is received over the propagation channel 334, and input to an E-DPDCH physical channel processing block 336, an E-DPCCH soft-symbol generation block 338 and a DPCCH channel estimation block 340. As is well-known in the art, the DPCCH channel estimation block 340 generates channel estimates using pilots transmitted on the DPCCH. The channel estimates may be generated in any well-known manner, and will not be discussed further herein for the sake of brevity. The channel estimates generated at the DPCCH channel estimation block 340 may be output to the E-DPDCH transport channel processing block 342 and to E-DPCCH processing block 338.

At the E-DPCCH processing block 338, the DPCCH channel estimates are used to generate E-DPCCH soft-symbols. The E-DPCCH soft-symbols are used in recovering the transmitted E-DPCCH word at the E-DPCCH processing block 338. The E-DPCCH processing block 338 also performs control channel DTX detection to determine that an E-DPCCH and E-DPDCH pair has been received at the receiver 350. The DPCCH channel estimates and the E-DPCCH word are sent to the E-DPDCH physical channel processing block 336 and the E-DPDCH transport channel processing block 342 for use in processing the E-DPDCH if an E-DPDCH is detected at the E-DPCCH processing block 338.

Still referring to FIG. 3, the E-DPDCH physical channel processing block 336 may generate a first received data frame from the received signal. In one example, the E-DPDCH physical channel processing block 336 may use maximal ratio combining techniques to generate the first received data frame, where the first received data frame includes a plurality of soft-symbols referred to as a soft-symbol sequence. The soft-symbol sequence may be an estimate of the symbol sequence included in the data frame transmitted by the transmitter 300. The soft-symbol sequence may be output to a transport channel processing block 342. The transport channel processing block 342 may perform HARQ combining, turbo decoding and CRC checks to recover the transmitted transport channel data bits.

Conventionally, each UE in a cell has a maximum transmit power with which the UE may transmit. When a UE is at a cell edge or in deep fade, the NodeB may request transmission power that exceeds a maximum transmit power limit. However, when the UE exceeds this transmission power limit, and the NodeB requests more transmit power, the transmission power (or gain) of the uplink E-DPCCH must be reduced first in order to bring the total transmit power within the UE's maximum transmit power limit without reducing the power of other legacy channels such as the DPCCH, DPDCH and/or the HS-DPCCH. If, as a result, the E-DPDCH power is below a certain level, the UE may mute the transmission of the E-DPDCH completely if a DPDCH is present.

Because the E-DPDCH transmission power reduction is transparent to higher layers, it is unknown to the NodeB. In some cases, the NodeB needs to know the proper scaling of a turbo decoder input soft symbol. In another example, the RNC should know the power reduction status of the E-DPDCH for driving outer loop power control. In this case, if power reduction on the E-DPDCH is detected, the signal-to-interference ratio (SIR) target may be adjusted differently.

For an uplink transmitter at the UE, when a maximum transmit power is exceeded, the UE must reduce the E-DPDCH gain factor to bring the total transmit power within the maximum transmit power limit. The power reduction is performed for each E-DPDCH timeslot (e.g., at the E-DPDCH timeslot boundary) because the amount of power reduction may vary from slot to slot depending on the loading of other code channels.

SUMMARY OF THE INVENTION

Example embodiments of the present invention relate to methods for detecting transmission power reduction and/or discontinuous transmission (DTX) of an enhanced data channel, such as, the E-DPDCH. The methods may be performed on an enhanced data channel timeslot and/or frame basis, for example, the power reduction detection may be done on at an enhanced data channel frame boundary and/or a DPCCH timeslot boundary.

In example embodiments of the present invention, the transmission power reduction detection may be performed after decoding a received signal and/or after transmitted data has been recovered at a receiver.

In example embodiments of the present invention, the actual enhanced data channel to control channel power ratio may be estimated and compared with a threshold value (e.g., a reference enhanced data channel to control channel ratio) associated with or corresponding to the TFI from received on the enhanced control channel.

At least one example embodiment provides a method for detecting transmission power reduction in a physical channel including at least a non-enhanced data channel portion, a non-enhanced control channel portion associated with the non-enhanced data channel portion, an enhanced data channel portion and an enhanced control channel portion associated with the enhanced data channel portion. The enhanced data channel portion may carry higher data rate data than the non-enhanced data channel portion. According to this example embodiment, the method may include estimating a ratio of a transmission power associated with the enhanced data channel portion to transmission power associated with the non-enhanced control channel portion; comparing the estimated ratio with a first threshold, the first threshold being determined based on a format indicator associated with the enhanced data channel portion; and detecting a transmission power reduction in the enhanced data channel portion based on the comparing step.

According to at least one example embodiment, the estimating step may estimate the ratio based on channel estimates associated with the non-enhanced control channel portion, a decoded signal portion and data recovered based on the decoded signal portion.

Another example embodiment provides a transmission power reduction detector for detecting a transmission power reduction in a physical channel including at least a non-enhanced data channel portion, a non-enhanced control channel portion associated with the non-enhanced data channel portion, an enhanced data channel portion and an enhanced control channel portion associated with the enhanced data channel portion. The enhanced data channel portion may carry higher data rate data than the non-enhanced data channel portion. The detector may include an estimation block configured to estimate a ratio of a transmission power associated with the enhanced data channel portion to transmission power associated with the non-enhanced control channel portion, and a comparing block configured to compare the estimated ratio with a threshold, the threshold being determined based on a format indicator associated with the enhanced data channel portion. The detector may be configured to detect a transmission power reduction in the enhanced data channel based on the comparison of the estimated ratio with a threshold.

According to at least some example embodiments, the detecting step may detect the transmission power reduction if the estimated transmission power is less than the first threshold. The first threshold may be a reference ratio of the enhanced data channel portion transmission power to the non-enhanced control channel portion transmission power. The method may further include setting a power reduction detection flag if the detecting step detects a transmission power reduction, the power reduction flag indicating that the transmission power associated with the enhanced data channel portion has been decreased, and decoding the enhanced data channel portion without the use of the non-enhanced control information if the setting step sets the power reduction detection flag.

The estimating step may estimate the ratio based on channel estimates associated with the non-enhanced control channel portion and a decoded signal portion received on the enhanced data channel portion. The detecting step may detect the transmission power reduction if the estimated transmission power is less than the threshold. The threshold may be a reference ratio of enhanced data channel transmission power to control channel transmission power.

According to at least some example embodiments, channel estimates associated with the non-enhanced control channel portion may be generated based on a received signal, and an enhanced data channel portion of the received signal may be decoded to generate the decoded signal portion. The estimating step may estimate the ratio based on the channel estimates and the decoded signal portion. Within the estimating step, the decoded signal portion may be squared and accumulated over a first time interval to generate a first estimated transmission power. The first estimated transmission power may be associated with the enhanced data channel portion. The channel estimates may be squared and accumulated over a first time interval to generate a second estimated transmission power, the second estimated transmission power being associated with the non-enhanced control channel portion. The ratio may be estimated based on the first and second estimated transmission powers.

According to at least some example embodiments, the ratio may be estimated by dividing the first estimated transmission power by the second estimated transmission power. The estimated ratio may be compared with a second threshold, which may be determined based on a format set size associated with the non-enhanced control channel portion. A discontinuous transmission may be detected in the non-enhanced control channel portion based on the comparing step. A DTX detection flag may be set if a discontinuous transmission is detected, and the DTX detection flag may indicate that the non-enhanced control channel portion is no longer being transmitted. The enhanced data channel portion may be decoded without the use of control information if the setting step sets the DTX detection flag.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
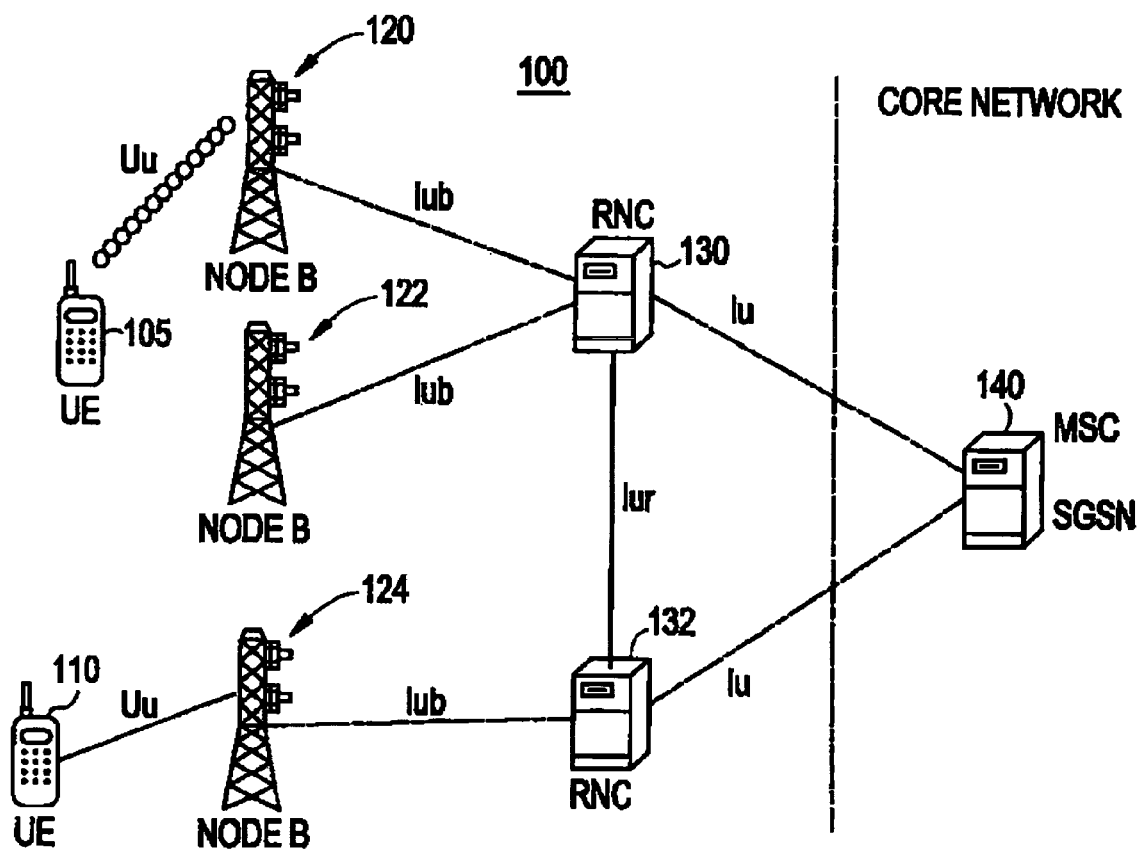
FIG. 1 illustrates a conventional wireless communication system operating in accordance with UMTS protocols.
Figure 2A:
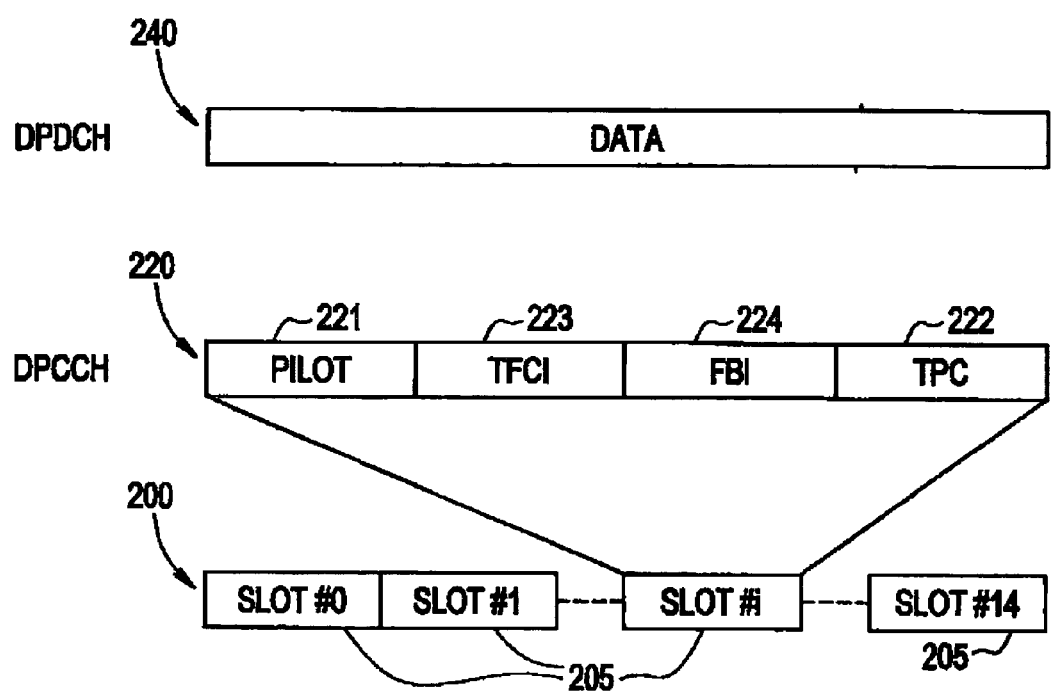
FIG. 2A illustrates an example of a conventional frame structure of uplink dedicated physical channels.
Figure 2B:
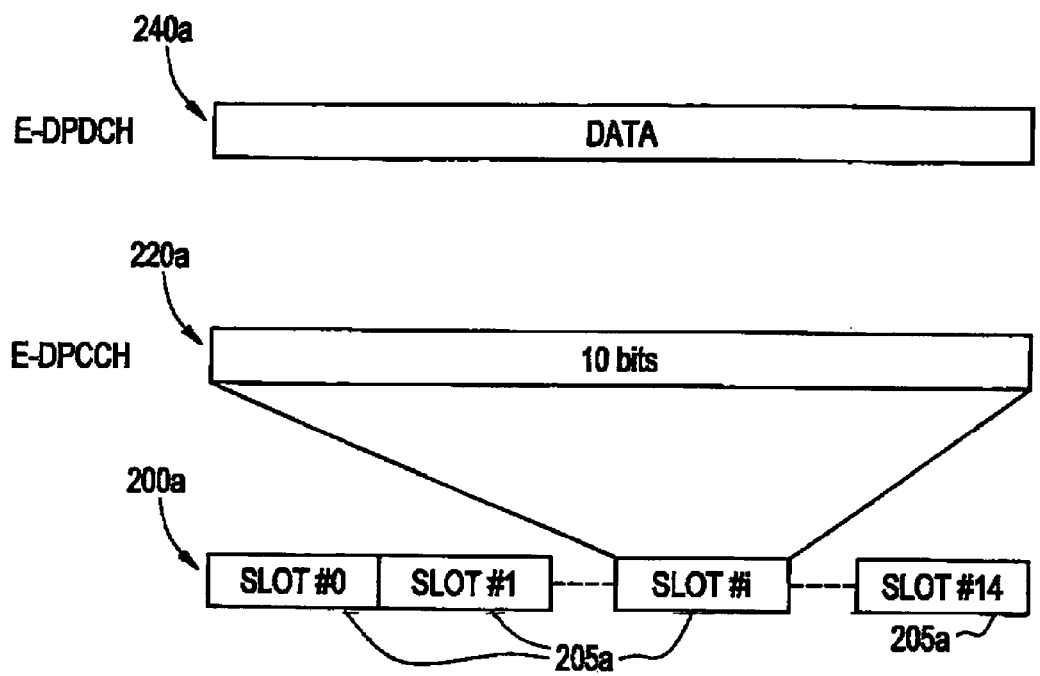
FIG. 2B illustrates an example of a conventional frame structure of uplink enhanced dedicated physical channels.
Figure 2C:
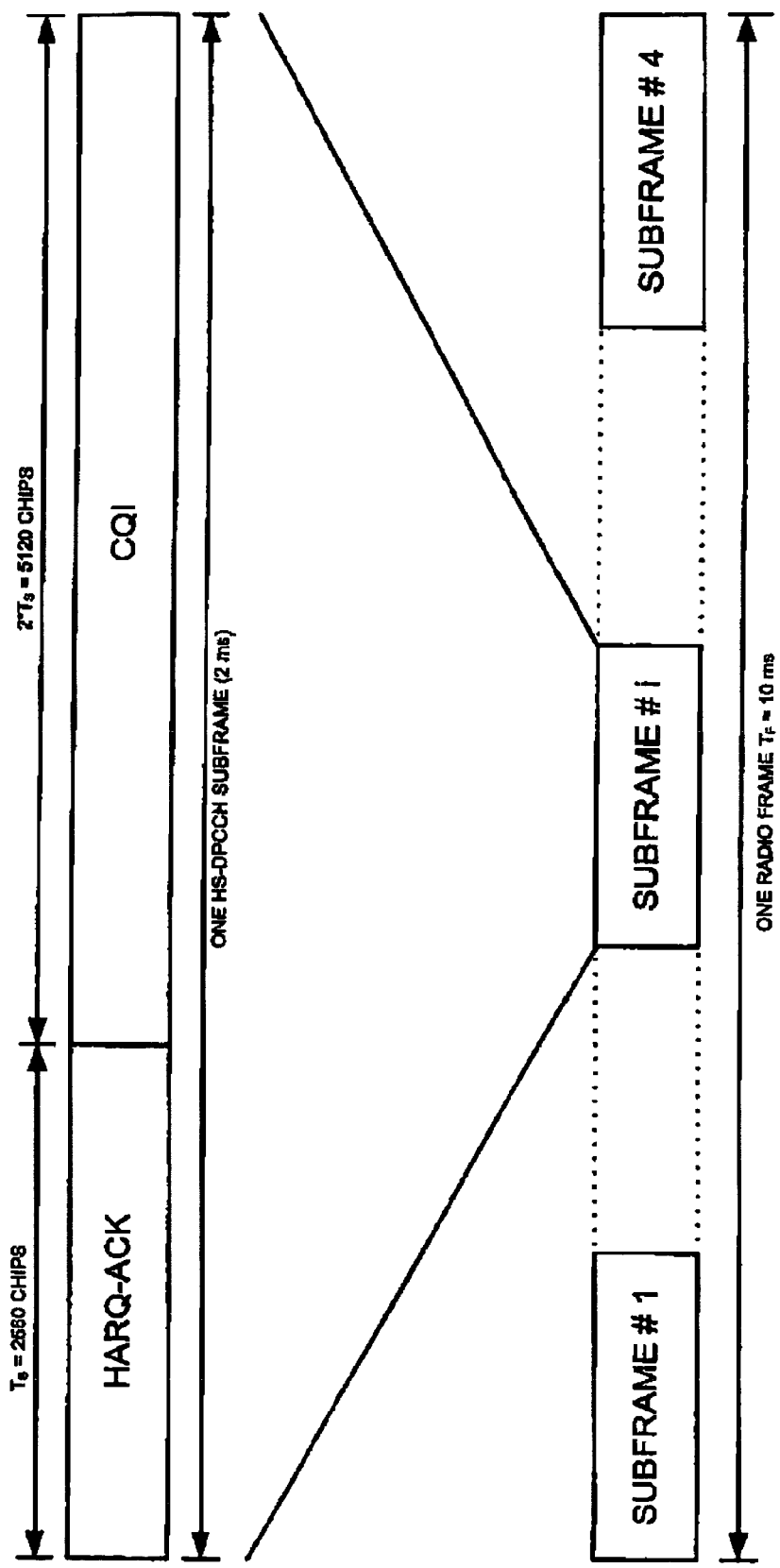
FIG. 2C illustrates an example of a conventional frame structure of uplink high speed dedicated physical control channel.

As discussed herein, the E-DPCCH and E-DPDCH may be referred to as an enhanced control channel portion and enhanced data channel portion, respectively, and the DPCCH and DPDCH may be referred to as a non-enhanced or legacy data channel portion and a non-enhanced or legacy control channel portion, respectively. FIG. 4 illustrates a UMTS uplink receiver, according to an example embodiment of the present invention. The receiver 450 may replace or be co-located along with the receiver 350 of FIG. 3 at the Node B.

Referring to FIG. 4, the receiver 450 receives a transmitted signal over the propagation channel 334, and the received signal is input to the E-DPDCH physical channel processing block 436, E-DPCCH soft-symbol generation block 438 and a DPCCH channel estimation block 440.

Figure 3:
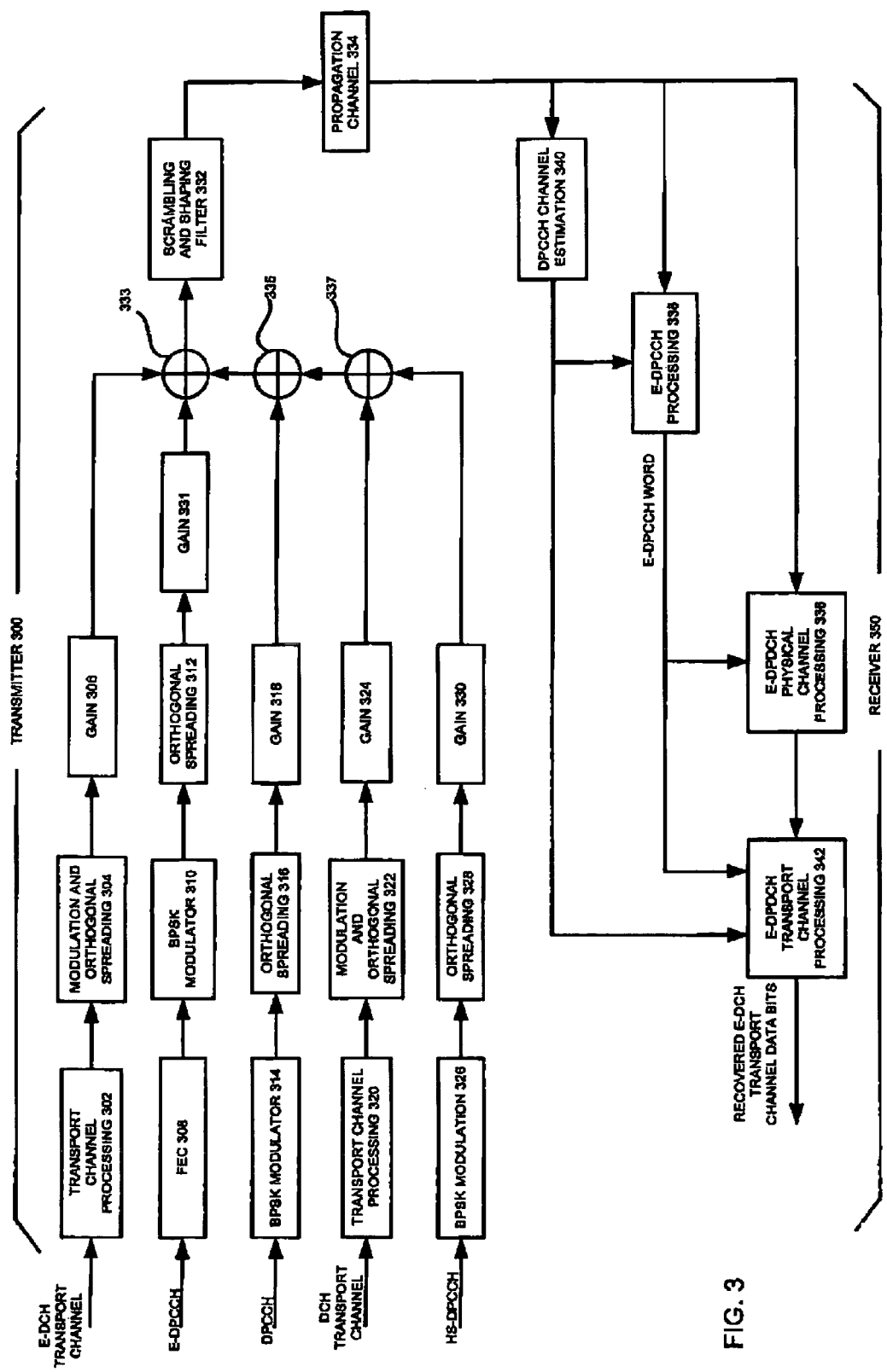
FIG. 3 illustrates a conventional UMTS uplink transmitter and receiver.
Figure 4:
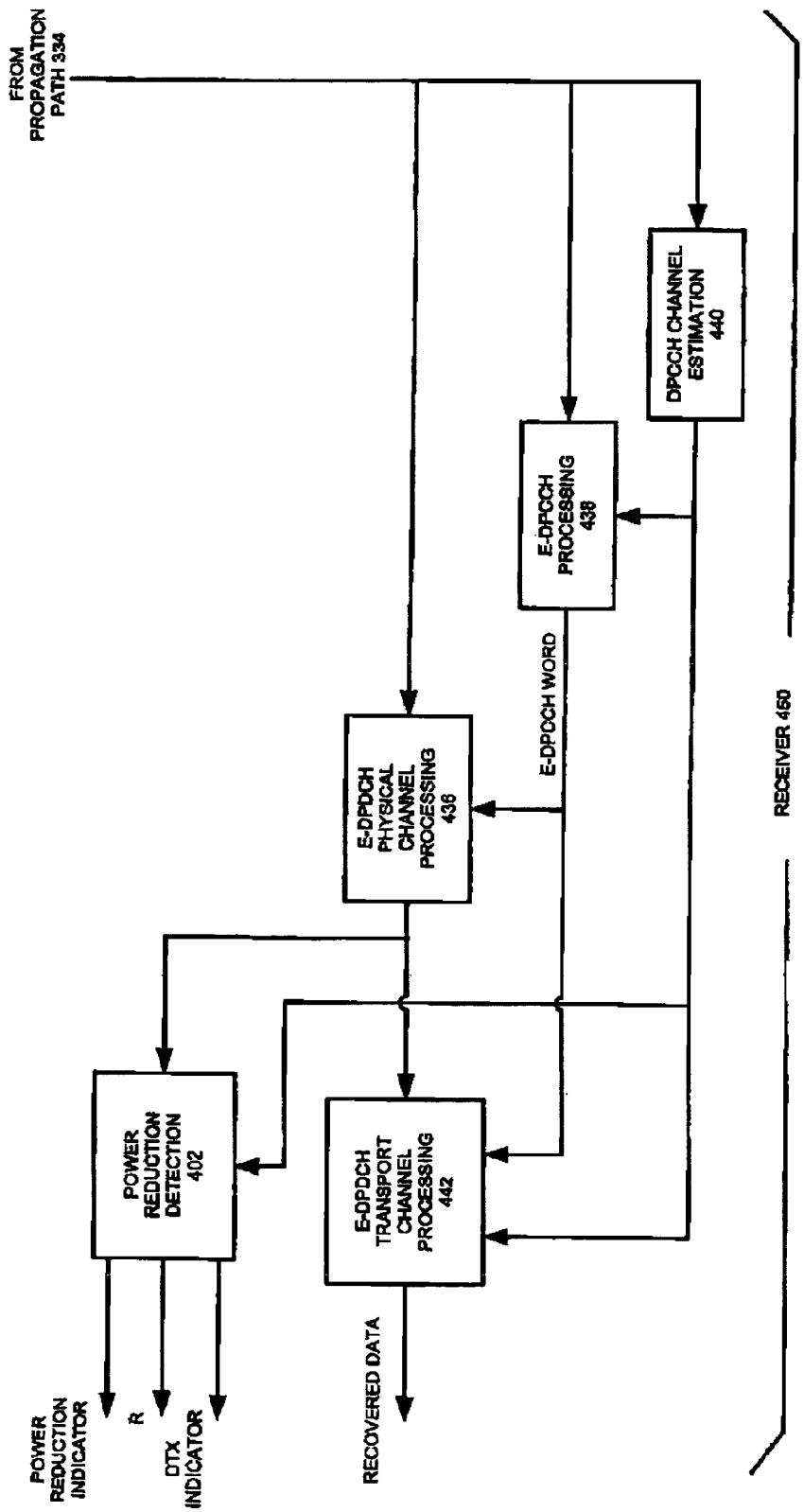
FIG. 4 illustrates a UMTS uplink receiver, according to an example embodiment of the present invention.

The DPCCH channel estimation block 440 generates channel estimates using pilots transmitted on the DPCCH in the same manner as discussed above with regard to the DPCCH channel estimation block 340 of FIG. 3. The DPCCH channel estimates generated in the DPCCH channel estimation block 440 may be output to the E-DPDCH transport channel processing block 442, the E-DPCCH processing block 438 and a power reduction detection block 402.

The E-DPCCH processing block 438 may generate E-DPCCH soft-symbols and recover the transmitted E-DPCCH word using the DPCCH channel estimates in the same manner as discussed above with regard to the E-DPCCH processing block 338 of FIG. 3. The E-DPCCH processing block 438 also performs E-DPCCH DTX detection to determine if an E-DPCCH and E-DPDCH pair has been received at the receiver 450 in the same manner as the E-DPCCH processing block 338 of FIG. 3. E-DPCCH processing block 438 may send the recovered E-DPCCH word to the E-DPDCH physical channel processing block 436 and the E-DPDCH transport channel processing block 442 for use in processing the E-DPDCH if an E-DPDCH is detected at the E-DPCCH processing block 438.

Still referring to FIG. 4, the E-DPDCH physical channel processing block 436 may generate a first received data frame or decoded signal. In one example, as discussed above, the E-DPDCH physical channel processing block 436 may use maximal ratio combining techniques to generate the decoded signal, where the decoded signal includes a plurality of soft-symbols referred to as a soft-symbol sequence. The soft-symbol sequence may be an estimate of the symbol sequence included in the data frame transmitted by the transmitter 300 of FIG. 3. The soft-symbol sequence may be output to a transport channel processing block 442 and the power reduction detection block 402.

The transport channel processing block 442 may perform HARQ combining, turbo decoding and CRC checks to recover the transmitted data, for example, transmitted transport channel data bits, as discussed above with regard to the transport channel processing block 342 of FIG. 3.

Referring still to FIG. 4, the power reduction detection block 402 may generate a power reduction indicator based on the E-DPDCH soft-symbol sequence and the DPCCH channel estimates. The power reduction indicator generated by the power reduction detection block 402 may be represented by a single bit (e.g., a flag bit), and may indicate detection of a discontinuous transmission (DTX) of the E-DPDCH at the receiver 450. That is, for example, the power reduction detection indicator may indicate that receiver 450 has detected a decrease in the transmission power or gain of the E-DPDCH, for example, to zero or substantially zero. This may further indicate to the Node B that the transmitting UE is no longer transmitting the E-DPDCH.

According to at least some example embodiments, the Node B may utilize the detected transmission power reduction on the E-DPDCH in scaling turbo decoder input soft-symbols. The Node B may also or alternatively utilize the detected transmission power reduction when E-DPDCH cyclic redundancy check (CRC) is used to drive the outer-loop power control. Using E-DPDCH CRC to drive the outer-loop power control is well-known in the art. In this example, if the transmission power reduction on the E-DPDCH is detected, the target signal-to-interference ratio (SIR) may be adjusted more accurately. In another example, the detected transmission power reduction on the E-DPDCH may be used to adjust the maximum number of retransmission for an HARQ process to reduce higher layer retransmissions. This may be done using well-known reconfiguration processes.

The power reduction detection block 402 will be discussed in more detail with regard to FIG. 5 below.

Figure 5:
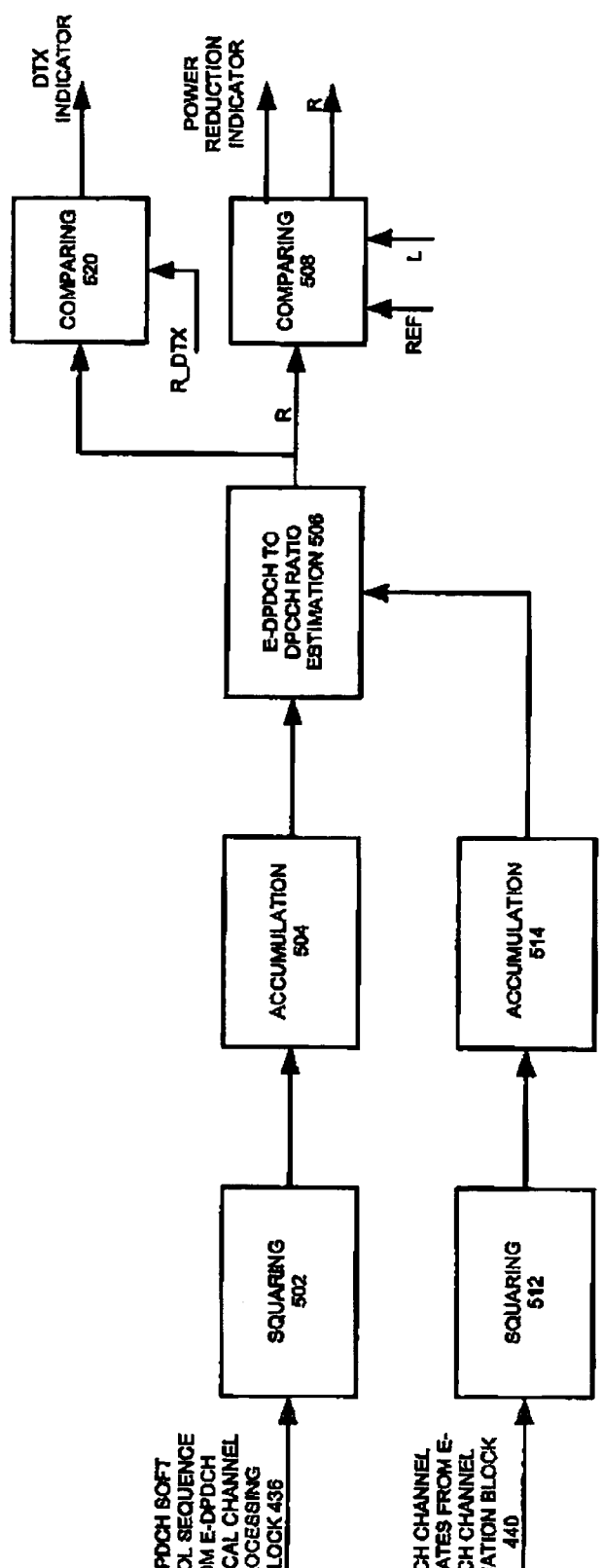
FIG. 5 is a block diagram of a power reduction block, according to an example embodiment of the present invention.

FIG. 5 is a block diagram illustrating the power reduction detection block 402 in more detail. As shown, the power reduction detection block 402 may receive the decoded signal (e.g., the E-DPDCH soft-symbol sequence) from the physical channel processing block 436 and DPCCH channel estimates from DPCCH channel estimation block 440. The DPCCH channel estimates may be non-normalized. The E-DPDCH soft-symbols may be squared at squaring block 502 to remove modulation of the soft-symbol sequence. The demodulated soft-symbol sequence may be accumulated using simple addition over a time interval T at accumulation block 504 to generate an estimate of a product of the E-DPDCH signal energy and the DPCCH signal energy over time interval T. In other words, the accumulation block 504 may output the estimated product of the E-DPDCH signal energy and the DPCCH signal energy over time interval T to DPCCH ratio estimation block 506.

Because E-DPDCH power reduction is performed per time slot, the time interval T may be a timeslot or ⅔ ms. However, alternatively, the time interval T may be as large as the length of a subframe (e.g., 2 ms) or a frame (10 ms), depending on the application of the power reduction detection block 402.

Returning to FIG. 5, the DPCCH signal energy for time interval T may be determined by squaring the sum of the DPCCH channel estimates output from the DPCCH channel estimation block 440 at squaring block 512, and accumulating the squared DPCCH channel estimates over the time interval T at DPCCH accumulation block 514. The DPCCH signal energy may also be output to the E-DPDCH to DPCCH ratio estimation block 506.

The E-DPDCH to DPCCH ratio estimation block 506 may calculate an estimated E-DPDCH to DPCCH ratio R by dividing the product of the E-DPDCH signal energy and the DPCCH signal energy from block 504 by the square of the DPCCH signal energy received from block 514.

The estimated E-DPDCH to DPCCH ratio R may be output to comparing blocks 508 and 520, for example, concurrently. Although, FIG. 5 shows the comparing blocks 508 and 520 in parallel, they may also be arranged in a serially.

The comparing block 508 may compare the estimated E-DPDCH to DPCCH ratio R with a threshold value. The threshold value may be a scaled version of a reference E-DPDCH to DPCCH power ratio REF. The reference power ratio REF may be associated with and/or correspond to the TFI received on the E-DPCCH associated with the received E-DPDCH that is specified by the upper layers. The reference value REF may be scaled by a factor L. In other words, the reference power ratio REF may be multiplied by the scaling factor L to generate the threshold value. The factor L is determined to achieve a balance between the probability of making an error in the estimated power ratio (e.g., falsely detecting a power reduction) and the accuracy of the estimated R. As an example if R is estimated between 0.9*REF and 1.1*REF 99% of the time when there is no power reduction, and the accepted error of falsely detecting a power reduction is 1%, then L=0.9. According to at least some example embodiments, L may be reduced to provide more accurate power reduction detection, however, this may increase the number of false detections of power reduction.

At the comparing block 508, if the estimated E-DPDCH to DPCCH power ratio R is less than the threshold value L*REF, the power reduction detection block 402 may set the power reduction indicator (e.g., to have a value of 1) indicating that a power reduction of the E-DPDCH has been detected. On the other hand, if the estimated power ratio R is greater than the threshold value L*REF, the power reduction indicator may not be set indicating that power reduction of the E-DPDCH has not been detected. The comparing block 508 may also output the estimated E-DPDCH to DPCCH power ratio R to be used at later stages (e.g., at a turbo decoder) for adjusting the power level of the data received on the E-DPDCH.

Still referring to FIG. 5, at comparing block 520, the estimated E-DPDCH to DPCCH ratio R may be compared with a second threshold DTX_R. The threshold DTX_R may be a DTX detection threshold used to determine if the E-DPDCH has been fully DTXed (e.g., is no longer, or has not been transmitted). The second threshold DTX_R may be determined based on, for example, a transport format set size associated with the control channel and/or simulation results as is well-known in the art.

The comparing block 520 may output a DTX indicator based on the comparison. The DTX indicator may indicate whether the E-DPDCH has bee fully DTXed. For example, if the estimated E-DPDCH to DPCCH power ratio R is less than the threshold value DTX_R, the power reduction detection block 402 may set the DTX indicator (e.g., to have a value of 1) indicating that a DTX of the E-DPDCH has been detected. On the other hand, if the estimated power ratio R is greater than the threshold value DTX_R, the DTX indicator may not be set (e.g., to have a value 0) indicating that DTX of the E-DPDCH has not been detected.

Figure 6:
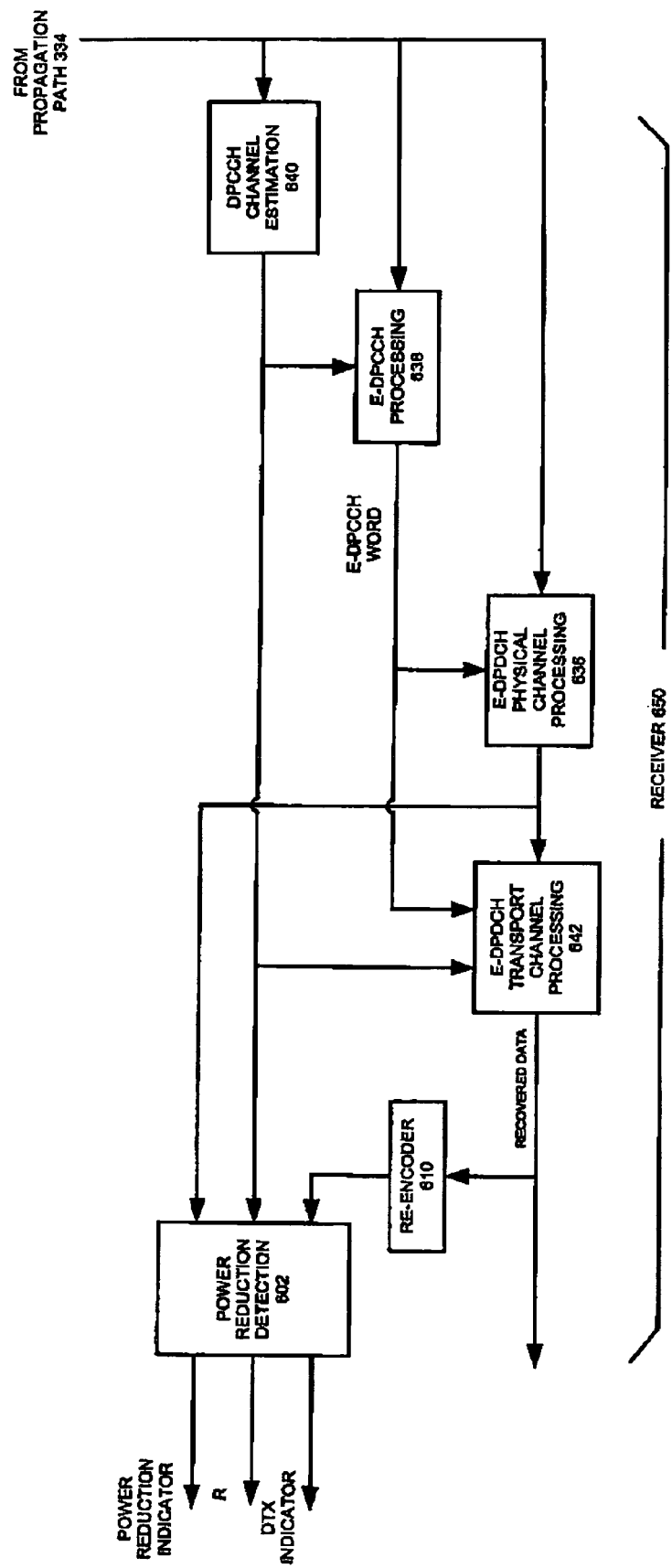
FIG. 6 illustrates a UMTS uplink receiver, according to another example embodiment of the present invention.

FIG. 6 illustrates a UMTS uplink receiver, according to another example embodiment of the present invention. At the receiver 650, the transmitted signal is received over the propagation channel 334, and input to the E-DPDCH physical channel processing block 636, E-DPCCH soft-symbol generation block 638 and a DPCCH channel estimation block 640. The DPCCH channel estimation block 640 generates channel estimates using pilots transmitted on the DPCCH in the same manner as discussed above with regard to the DPCCH channel estimation block 340 of FIG. 3. The DPCCH channel estimates generated in the DPCCH channel estimation block 640 may be output to the E-DPDCH transport channel processing block 642, the E-DPCCH processing block 638 and power reduction detection block 602.

The E-DPCCH processing block 638 may generate E-DPCCH soft-symbols and recover the transmitted E-DPCCH word in the same manner as the E-DPCCH processing block 338 of FIG. 3. The E-DPCCH processing block may output the recovered E-DPCCH word to the E-DPDCH processing block 636 and the E-DPDCH transport channel processing block 642.

The E-DPDCH physical channel processing block 636 may generate a first received data frame or decoded signal in the same manner as discussed above with regard to the E-DPDCH physical channel processing block 336 of FIG. 3, and the transport channel processing block 642 may recover the transmitted data in the same manner as discussed above with regard to the E-DPDCH transport channel processing block 342 of FIG. 3.

The recovered data may be output from the E-DPDCH transport channel processing block 642 to a re-encoder 610. The re-encoder 610 may re-encode the recovered data by performing operations as discussed above with regard to the transport channel processing block 302 of FIG. 3. The re-encoding block 610 may output the re-encoded data to the power reduction detection block 602.

The power reduction detection block 602 may generate a power reduction indicator based on the re-encoded data (e.g., re-encoded recovered transport channel data), the decoded signal (e.g., E-DPDCH soft-symbols) and control channel estimates (e.g., DPCCH channel estimates); a DTX indicator and an estimated ratio R. The power reduction detection block 602 will be discussed in more detail with regard to FIG. 7 below.

Similar to that as discussed above with regard to FIG. 4, according to at least some example embodiments, the Node B may utilize the detected transmission power reduction on the E-DPDCH in scaling turbo decoder input soft-symbols. The Node B may also or alternatively utilize the detected transmission power reduction when E-DPDCH cyclic redundancy check (CRC) is used to drive the outer-loop power control. Using E-DPDCH CRC to drive the outer-loop power control is well-known in the art. In this example, if the transmission power reduction on the E-DPDCH is detected, the target signal-to-interference ratio (SIR) may be adjusted more accurately. In another example, the detected transmission power reduction on the E-DPDCH may be used to adjust the maximum number of retransmission for an HARQ process to reduce higher layer retransmissions. This may be done using well-known reconfiguration processes.

Figure 7:
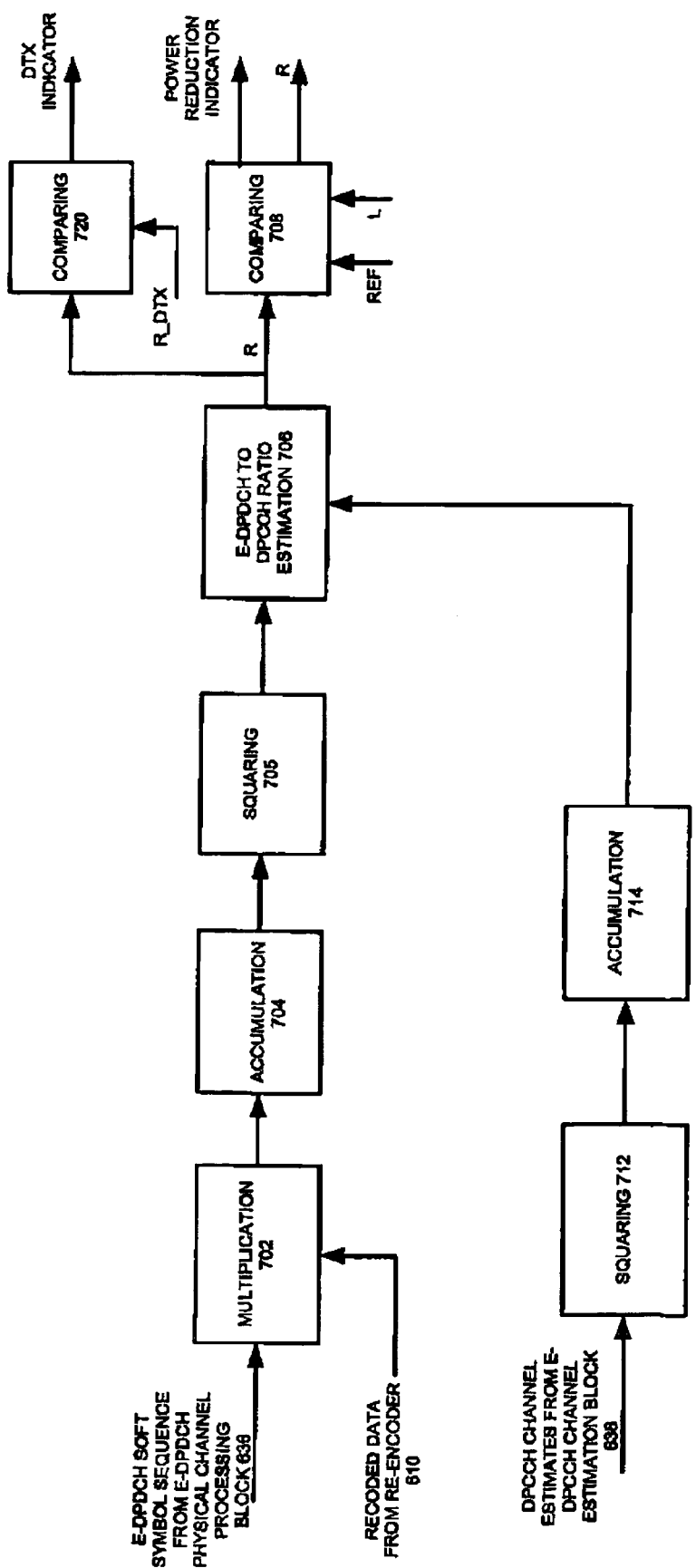
FIG. 7 is a block diagram of a power reduction block, according to another example embodiment of the present invention.

FIG. 7 is a block diagram illustrating the power reduction detection block 602 in more detail. The time interval T discussed below with regard to FIG. 7 may be the same time interval T as discussed above with regard to FIG. 5.

Referring to FIG. 7, at multiplication block 702, the decoded signal may be combined (e.g., multiplied by the re-encoded data). The product may be accumulated over a time interval T at accumulation block 704 to generate the E-DPDCH signal energy over the time interval T. The E-DPDCH signal energy over the time interval T may also be referred to as a first composite signal energy. The accumulation block 704 may output the E-DPDCH signal energy to the squaring block 705. The E-DPDCH signal energy may be squared at squaring block 705 to estimate a product of the E-DPDCH signal energy and the DPCCH signal energy over time interval T.

Still referring to FIG. 7, the DPCCH signal energy for time interval T may be determined by squaring the sum of the channel estimates output from the DPCCH channel estimation block 638 at squaring block 712, and accumulating the squared DPCCH channel estimates over the time interval T at DPCCH accumulation block 714. The DPCCH signal energy may also be output to the E-DPDCH to DPCCH ratio estimation block 706. As discussed above with regard to FIG. 5, the DPCCH channel estimates received from the DPCCH channel estimation block 638 may be non-normalized. The DPCCH signal energy over time interval T may be referred to as the second composite signal energy. The DPCCH signal energy may be output to the E-DPDCH to DPCCH ratio estimation block 706.

The E-DPDCH to DPCCH ratio estimation block 706 may calculate an estimated E-DPDCH to DPCCH power ratio R in the same manner as discussed above with regard to the E-DPDCH to DPCCH ratio estimation block 506 of FIG. 5. The estimated E-DPDCH to DPCCH power ratio R may be output to comparing blocks 708 and 720, for example, concurrently. Although, FIG. 5 shows the comparing blocks 708 and 720 in parallel, they may also be arranged in a serially.

The comparing block 708 may compare the estimated E-DPDCH to DPCCH ratio R with a threshold value L*REF in the same manner as described above with regard to the comparing block 508 of FIG. 5, and output the power reduction indicator and the estimated E-DPDCH to DPCCH ratio R in the same manner as discussed above with regard to FIG. 5. In addition, the threshold L*REF may be the same as the threshold discussed above with regard to FIG. 5.

The comparing block 720 may compare the estimated E-DPDCH to DPCCH ratio R with a threshold value DTX_R in the same manner as described above with regard to the comparing block 520 of FIG. 5, and output the DTX indicator in the same manner as discussed above with regard to FIG. 5. In addition, the threshold DTX_R may be the same as the threshold discussed above with regard to FIG. 5.

Although discussed separately, the power reduction blocks 402 and 602 shown in FIGS. 4-7 may be included in the same receiver and used in combination with one another. For example, the estimated E-DPDCH to DPCCH ratio R determined at the E-DPDCH to DPCCH ratio estimation block 506 may be used to scale the E-DPDCH soft-symbols for the turbo decoder at the E-DPDCH transport channel processing block 442 and/or 642.

Performing power reduction detection after re-encoding the transmitted data may improve estimation of E-DPDCH signal energy.

Although example embodiments of the present invention have been discussed as being performed on a per slot basis, at the end of an E-DPDCH frame, when the maximum number of transmissions for a transport channel is reached (e.g., the RSN has a value of 3) or when the CRC check yields a pass, all past and current transmissions for the same transport channel packet may be examined retroactively and the E-DPDCH power reduction data may be passed to the higher layer.

As will be appreciated by one of ordinary skill in the art, components, such as, power reduction detection blocks 402 and/or 602, the E-DPDCH physical channel processing block 436 and/or 636, the E-DPDCH transport channel processing blocks 442 and/or 642, and all other components of the UMTS uplink receivers, according to example embodiments of the present invention, may be implemented, for example, by way of a programmable digital signal processor (DSP), an application specific integrated circuit (ASIC), a field programmable gate array (FPGA), or any other suitable component commonly found in a conventional CDMA receiver.

The invention being thus described, it will be obvious that the same may be varied in many ways. Such variations are not to be regarded as a departure from the invention, and all such modifications are intended to be included within the scope of the invention.

We claim:

1. A method for detecting transmission power reduction in a physical channel at a receiver, the physical channel including at least a non-enhanced data channel portion, a non-enhanced control channel portion associated with the non-enhanced data channel portion, an enhanced data channel portion and an enhanced control channel portion associated with the enhanced data channel portion, the enhanced data channel portion for carrying higher data rate data than the non-enhanced data channel portion, the method comprising:
    estimating a ratio of a transmission power associated with the enhanced data channel portion to transmission power associated with the non-enhanced control channel portion based on channel estimates associated with the non-enhanced control channel portion and a decoded signal portion received on the enhanced data channel portion;
    comparing the estimated ratio with a first threshold, the first threshold being determined based on a format indicator associated with the enhanced data channel portion; and
    detecting a transmission power reduction in the enhanced data channel portion based on the comparing step.

2. The method of claim 1, wherein the detecting step detects the transmission power reduction if the estimated transmission power is less than the first threshold.

3. The method of claim 1, wherein the first threshold is a reference ratio of enhanced data channel portion transmission power to the non-enhanced control channel portion transmission power.

4. The method of claim 1, further comprising:
    setting a power reduction detection flag if the detecting step detects a transmission power reduction, the power reduction flag indicating that the transmission power associated with the enhanced data channel portion has been decreased; and
    receiving data transmitted on the enhanced data channel at a reduced transmission power if the setting step sets the power reduction detection flag.

5. The method of claim 1, wherein the detecting step detects the transmission power reduction if the estimated transmission power is less than the threshold.

6. The method of claim 1, wherein the threshold is a reference ratio of enhanced data channel transmission power to control channel transmission power.

7. The method of claim 1, further comprising:
    generating the channel estimates associated with the non-enhanced control channel portion based on a received signal; and
    decoding an enhanced data channel portion of the received signal to generate the decoded signal portion; wherein
    the estimating step estimates the ratio based on the channel estimates and the decoded signal portion.

8. The method of claim 7, wherein the estimating step further comprises:
    squaring and accumulating the decoded signal portion over a first time interval to generate a first estimated transmission power, the first estimated transmission power being associated with the enhanced data channel portion;
    squaring and accumulating the channel estimates over a first time interval to generate a second estimated transmission power, the second estimated transmission power being associated with the non-enhanced control channel portion; and
    estimating the ratio based on the first and second estimated transmission powers.

9. The method of claim 8, wherein the estimating step estimates the ratio by dividing the first estimated transmission power by the second estimated transmission power.

10. The method of claim 1, further comprising:
comparing the estimated ratio with a second threshold, the second threshold; and
detecting a discontinuous transmission in the non-enhanced control channel portion based on the comparing step.

11. The method of claim 1, wherein the estimating step estimates the ratio based on the channel estimates associated with the non-enhanced control channel portion, the decoded signal portion and data recovered based on the decoded signal portion.

12. The method of claim 11, wherein the decoded signal portion is an enhanced data channel portion of the decoded signal.

13. The method of claim 11, wherein the detecting step detects the transmission power reduction if the estimated transmission power is less than the threshold.

14. The method of claim 11, wherein the threshold is a reference ratio of enhanced data channel transmission power to control channel transmission power.

15. The method of claim 11, further comprising:
generating the channel estimates associated with the non-enhanced control channel portion based on a received signal;
decoding an enhanced data channel portion of the received signal to generate the decoded signal portion;
recovering transmitted data based on the channel estimates, control information associated with the enhanced control channel portion and the decoded signal portion; and
re-encoding the recovered data; wherein the estimating step estimates the ratio based on the channel estimates, the decoded signal portion and the re-encoded data.

16. The method of claim 11, wherein the estimating step further comprises:
combining the decoded signal portion and the re-encoded data to generate a first composite signal energy;
accumulating the first composite signal energy over a first time interval;
squaring the accumulated first composite signal energy to generate a first estimated transmission power, the first estimated transmission power being associated with the enhanced data channel portion;
squaring and accumulating the channel estimates over a first time interval to generate a second estimated transmission power, the second estimated transmission power being associated with the non-enhanced control channel portion; and
estimating the ratio based on the first and second estimated transmission powers.

17. The method of claim 16, wherein the estimating step estimates the ratio by dividing the first estimated transmission power by a square of the second estimated transmission power to generate the ratio.

18. The method of claim 11, further comprising:
comparing the estimated ratio with a second threshold; and
detecting whether data is being transmitted on the enhanced data channel portion based on the comparing step; and
receiving transmitted data on the enhanced data channel if the detecting step detects transmitted data.

19. A transmission power reduction detector for detecting a transmission power reduction in a physical channel at a receiver, the physical channel including at least a non-enhanced data channel portion, a non-enhanced control channel portion associated with the non-enhanced data channel portion, an enhanced data channel portion and an enhanced control channel portion associated with the enhanced data channel portion, the enhanced data channel portion for carrying higher data rate data than the non-enhanced data channel portion, the detector comprising:
an estimation block configured to estimate a ratio of a transmission power associated with the enhanced data channel portion to transmission power associated with the non-enhanced control channel portion based on channel estimates associated with the non-enhanced control channel portion and a decoded signal portion received on the enhanced data channel portion;
a comparing block configured to compare the estimated ratio with a threshold, the threshold being determined based on a format indicator associated with the enhanced data channel portion; wherein the detector is configured to detect a transmission power reduction in the enhanced data channel based on the comparison of the estimated ratio with a threshold.

* * * * *